United States Patent
Lopez

(10) Patent No.: US 10,397,446 B2
(45) Date of Patent: Aug. 27, 2019

(54) CORRECTING COLOR DIFFERENCES BETWEEN SCANNER MODULES

(71) Applicant: HEWLETT-PACKARD DEVELOPMENT COMPANY, L.P., Houston, TX (US)

(72) Inventor: Miguel Angel Lopez, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 15/544,790

(22) PCT Filed: Mar. 31, 2015

(86) PCT No.: PCT/US2015/023495
§ 371 (c)(1),
(2) Date: Jul. 19, 2017

(87) PCT Pub. No.: WO2016/159969
PCT Pub. Date: Oct. 6, 2016

(65) Prior Publication Data
US 2017/0359489 A1  Dec. 14, 2017

(51) Int. Cl.
*H04N 1/46* (2006.01)
*H04N 1/60* (2006.01)
*H04N 1/028* (2006.01)
*H04N 1/401* (2006.01)
*H04N 1/403* (2006.01)

(52) U.S. Cl.
CPC ....... *H04N 1/6055* (2013.01); *H04N 1/02805* (2013.01); *H04N 1/401* (2013.01); *H04N 1/403* (2013.01); *H04N 1/46* (2013.01); *H04N 1/603* (2013.01); *H04N 1/6019* (2013.01);
(Continued)

(58) Field of Classification Search
None
See application file for complete search history.

(56) References Cited

U.S. PATENT DOCUMENTS 5,014,123 A * 5/1991 Imoto ................ H04N 1/00267
358/506
5,157,518 A * 10/1992 Ohtaki ............... H04N 1/40056
358/443
(Continued)

FOREIGN PATENT DOCUMENTS

CN   101808183    8/2010
CN   103037139    4/2013
(Continued)

OTHER PUBLICATIONS

Image Access, CCD or CIS: The Technology Decision, Nov. 7, 2013 (6 pages).

*Primary Examiner* — Anh-Vinh T Nguyen
(74) *Attorney, Agent, or Firm* — HP Inc. Patent Department

(57) ABSTRACT

An example disclosed herein analyzes a first scan of a first target scanned with a first scanner module of a scanner, analyzes second scan of a second target scanned with a second scanner module of the scanner, identifies a color difference greater than a threshold color difference between the first scan and the second scan, and adjusts color settings for the first scanner module to correct the color difference to less than the threshold color difference.

19 Claims, 7 Drawing Sheets

(52) U.S. Cl.
CPC ... *H04N 1/6033* (2013.01); *H04N 2201/0081* (2013.01); *H04N 2201/0094* (2013.01)

(56) References Cited

U.S. PATENT DOCUMENTS

| | | | |
|---|---|---|---|
| 5,760,913 A * | 6/1998 | Falk | H04N 1/6033 358/504 |
| 6,016,354 A * | 1/2000 | Lin | G06K 9/0061 358/518 |
| 6,327,047 B1 | 12/2001 | Motamed | |
| 7,134,737 B2 * | 11/2006 | Vilanova | B41J 2/2132 347/19 |
| 7,800,779 B2 | 9/2010 | Fan et al. | |
| 7,982,921 B2 | 7/2011 | Ikari et al. | |
| 8,294,947 B2 | 10/2012 | Yanagi | |
| 8,498,020 B2 | 7/2013 | Hirano et al. | |
| 9,519,848 B2 * | 12/2016 | Morovic | B41J 2/2146 |
| 10,237,449 B2 * | 3/2019 | Shimizu | H04N 1/484 |
| 2004/0233467 A1 * | 11/2004 | Namizuka | G06T 3/4023 358/1.13 |
| 2004/0257600 A1 * | 12/2004 | Hiromatsu | H04N 1/58 358/1.9 |
| 2005/0243382 A1 * | 11/2005 | Wang | H04N 1/121 358/461 |
| 2008/0013133 A1 | 1/2008 | Taguchi | |
| 2008/0204782 A1 * | 8/2008 | Hiromatsu | H04N 1/401 358/1.9 |
| 2008/0231912 A1 * | 9/2008 | Murakata | H04N 1/00872 358/474 |
| 2008/0239334 A1 | 10/2008 | Jasinski et al. | |
| 2009/0034001 A1 | 2/2009 | Shiraishi et al. | |
| 2009/0066796 A1 * | 3/2009 | Karasyuk | G02B 5/201 348/187 |
| 2009/0116083 A1 | 5/2009 | Yoshizawa | |
| 2010/0208312 A1 | 8/2010 | Hashizume | |
| 2012/0019881 A1 | 1/2012 | Lammens et al. | |
| 2012/0050771 A1 * | 3/2012 | Sakatani | G03G 15/0131 358/1.9 |
| 2012/0206753 A1 | 8/2012 | Harasawa | |
| 2013/0003090 A1 * | 1/2013 | Sato | G03G 15/5062 358/1.9 |
| 2013/0058662 A1 * | 3/2013 | Nomura | G03G 15/55 399/15 |
| 2014/0226192 A1 * | 8/2014 | Takemura | G03G 15/5062 358/504 |
| 2014/0268258 A1 * | 9/2014 | Cuciurean-Zapan | H04N 1/60 358/504 |
| 2015/0156369 A1 * | 6/2015 | Reed | H04N 1/32309 382/100 |
| 2016/0044211 A1 * | 2/2016 | Yamaguchi | H04N 1/6072 358/2.1 |
| 2016/0132011 A1 * | 5/2016 | Shibuya | H04N 1/00068 358/1.1 |
| 2016/0248942 A1 * | 8/2016 | Horita | H04N 1/6019 |
| 2017/0054878 A1 * | 2/2017 | Takemura | H04N 1/6033 |
| 2017/0142292 A1 * | 5/2017 | Shimizu | H04N 1/484 |
| 2017/0176884 A1 * | 6/2017 | Miyake | G03G 15/043 |
| 2017/0289377 A1 * | 10/2017 | Goda | G06K 15/02 |

FOREIGN PATENT DOCUMENTS

| | | |
|---|---|---|
| CN | 103369197 | 10/2013 |
| JP | 2004180199 | 6/2004 |
| JP | 2009117890 | 5/2009 |
| JP | 2010193076 | 9/2010 |
| JP | 2014060545 | 4/2014 |
| KR | 1020150009850 | 1/2015 |

\* cited by examiner

CORRECTING COLOR DIFFERENCES BETWEEN SCANNER MODULES

BACKGROUND

Scanners convert physical media (e.g., documents, images, objects, etc.) into digital media. Some scanners, such as large format scanners (e.g., scanners greater than a designated threshold width, such as 24 inches wide, 36 inches wide, 42 inches wide, etc.), include a plurality of scanner modules. Such scanner modules may be contact image sensor (CIS) modules. The scanner modules may include a plurality of light emitters (e.g., light emitting diodes (LEDs)) to scan the physical media. For example, a CIS module may include a red LED, a green LED, and a blue LED (RGB) to scan the physical media.

Figure 1:
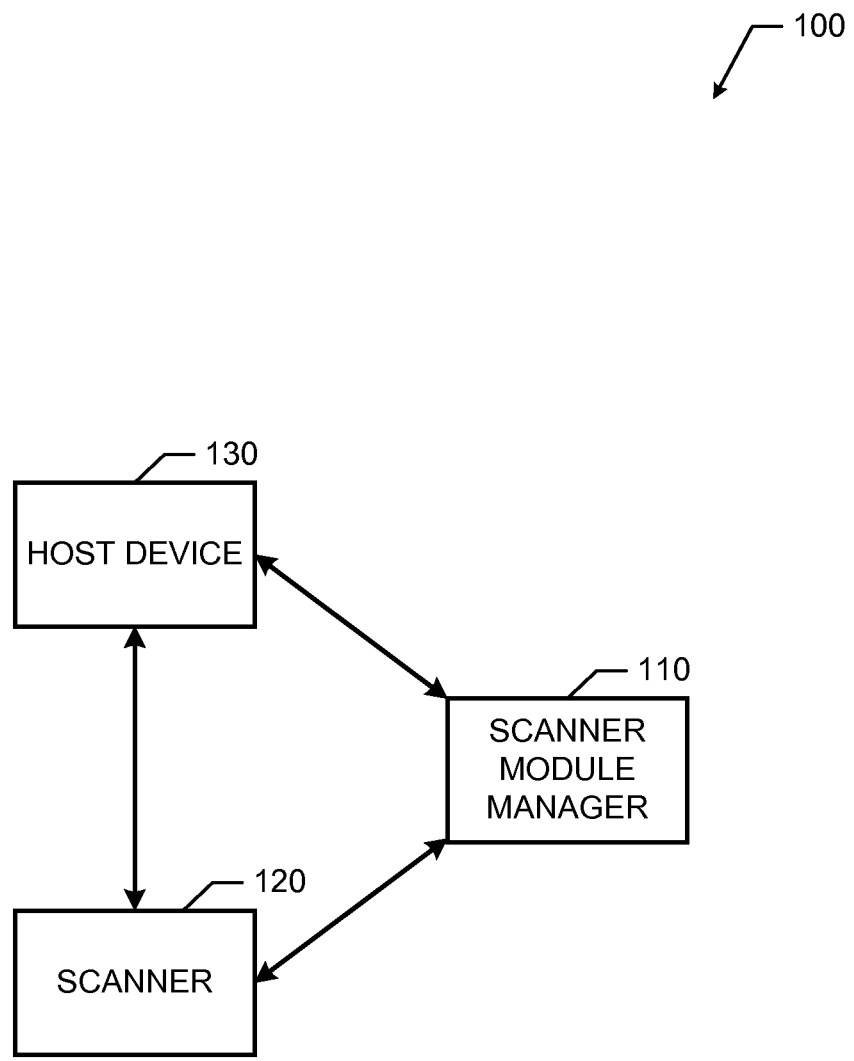
FIG. 1 is a block diagram of an example scanner system including a scanner module manager implemented in accordance with an aspect of this disclosure.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part is in contact with another part means that there is no intermediate part between the two parts.

DETAILED DESCRIPTION

Examples disclosed herein involve identifying a color difference in scans of respective scanner modules of a scanner and correcting the color difference by adjusting color settings of at least one of the scanner modules. In examples disclosed herein, the color difference may be greater than a threshold color difference and after adjusting the color settings, the color difference is less than the threshold color difference. Accordingly, examples disclosed herein provide for removing or addressing scanning imperfections for scanners including multiple scanner modules (e.g., large format scanners).

In examples disclosed herein, a color difference between a pair of scanner modules is identified and corrected. For example, color settings of a scanner module or color settings of media scanned by the scanner module may be adjusted based on the color difference. In some scanners, specifications of a first scanner module may be different than specifications of a second scanner module, which may cause a color difference between an image scanned by the first and second scanner modules. More specifically, a wavelength for a blue LED of the first scanner module may be different than a wavelength for a blue LED of the second scanner. In such an example, a portion of a scanned image may appear to have a different color than another portion of the scanned image. The example portion may be faded, tinted, etc. compared to the remainder of the image or neighboring portions of the image. In examples disclosed herein, color settings of the scanner module or image scanned by the scanner module may be adjusted to account for detected color differences.

An example method includes analyzing a first scan of a first target scanned with a first scanner module of a scanner and analyzing second scan of a second target scanned with a second scanner module of the scanner. The example method involves identifying a color difference greater than a threshold color difference between the first scan and the second scan and adjusting color settings for the first scanner module to correct the color difference to less than the threshold color difference.

FIG. 1 is a schematic diagram of an example scanner system 100 including a scanner module manager 110 constructed in accordance with an aspect of this disclosure. The example scanner system 100 includes the scanner module manager 110, a scanner 120, and a host device 130. In some examples, the scanner system 100 may include a network (e.g., an intranet, a local area network, a wide area network, the Internet, etc.) to facilitate communication between the scanner 120 and the host device 130. In some examples, the network may be located between the scanner module manager 110 and the scanner 120 and/or the host device 130. Although illustrated separately from the scanner 120 and the host device 130 in the example of FIG. 1, the scanner module manager 110 may be partially or entirely collocated with (or installed on) the scanner 120 and/or the host device 130.

In examples disclosed herein, the scanner 120 scans physical media (e.g., documents, images, objects, etc.) to generate digital media (e.g., image files, document files, etc.) corresponding to the scanned physical media. In examples disclosed herein, the physical media (e.g., target media) may be any type of substrate (e.g., paper, plastic, cardboard, cardstock, photo paper, canvas, metal, etc.). The example scanner 120 may be a two-dimensional (2D) scanner or a three-dimensional (3D) scanner. In some examples, the scanner 120 may be included in a multi-function printer (MFP). In such examples, the host device 130 may not necessarily be used in the scanner system 100 to control scanning or receive scanned media. Additionally, in some examples, the scanner module manager 110 may be included in the MFP that includes the scanner 120.

The host device 130 in the example scanner system 100 of FIG. 1 may be a computer (e.g., a laptop computer, a desktop computer, etc.), a mobile device (e.g., a smartphone, a tablet computer, etc.), or any other type of computing device. The example host device 130 may instruct the scanner 120 to scan media and/or may receive digital media from the scanner 120 corresponding to the scanned physical media. In some examples, the host device 130 may include or control the scanner module manager 110. The scanner module manager 110 of FIG. 1 analyzes scans of the scanner 120 and corrects detected color differences in the scans (e.g., by adjusting color settings for scanner modules of the scanner 120). As used herein, a scan refers to a digital copy (e.g., a digital image, a digital document, etc.) of media (e.g., an image, a document, an object, etc.) scanned by a scanner.

Figure 2:
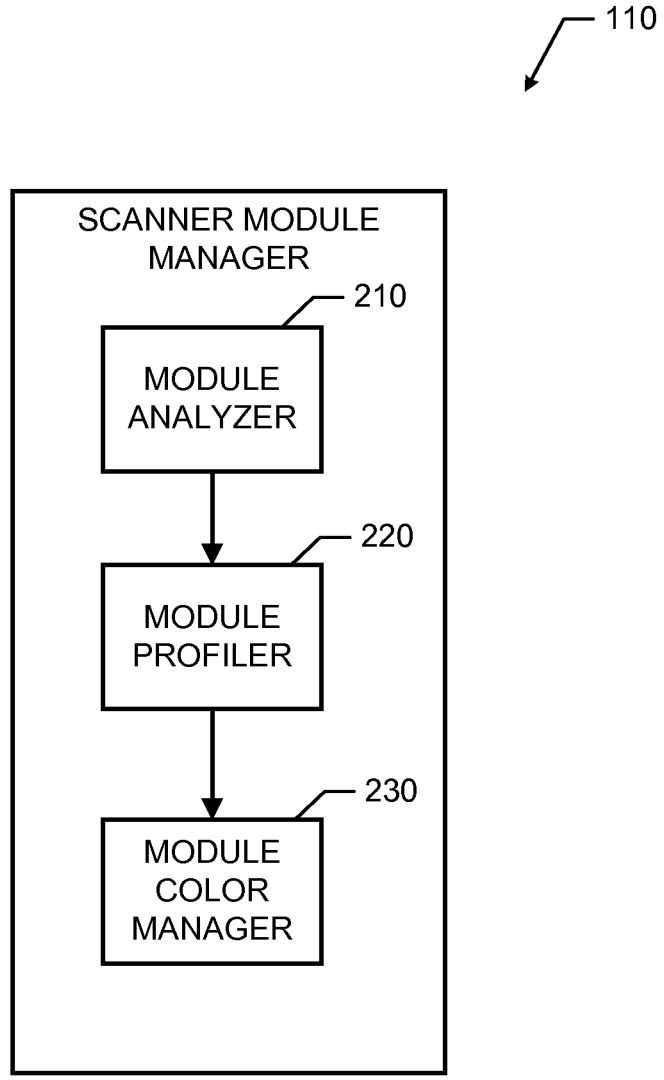
FIG. 2 a block diagram of an example scanner module manager that may be implemented by the scanner module manager of FIG. 1.

FIG. 2 is a block diagram of an example scanner module manager 110 that may be used to implement the scanner module manager 110 of FIG. 1. The example scanner module manager 110 of FIG. 2 includes a module analyzer 210, a module profiler 220, and a module color manager 230. In examples disclosed herein, the module analyzer 210 identifies color differences in scanned media, the module profiler 220 determines a color profile of portions of the scanned images, and the color manager 230 adjusts color settings for modules of a scanner (e.g., the scanner 120 of FIG. 1) to correct the color differences based on the color profiles.

Figure 3:
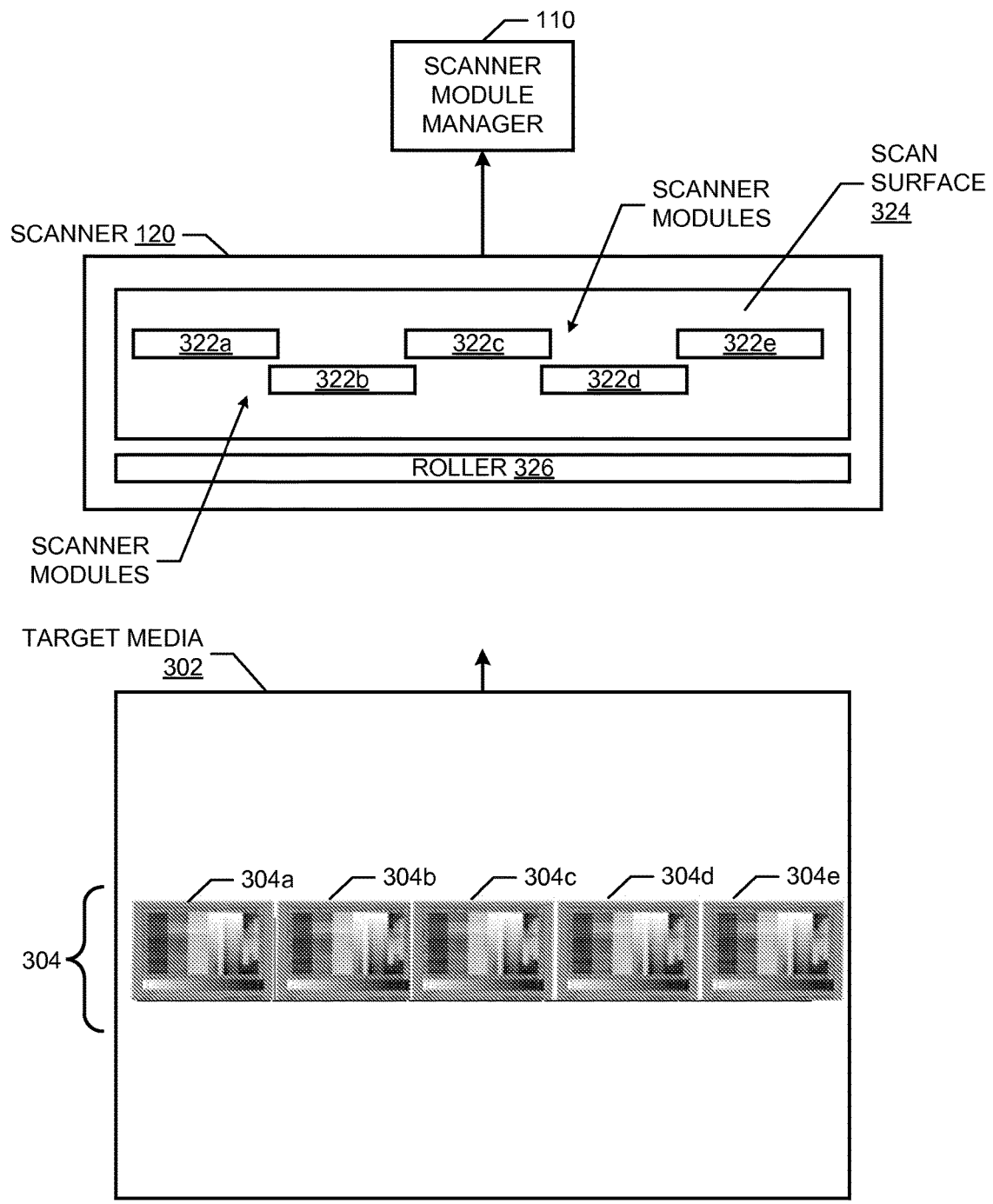
FIG. 3 is a schematic diagram of an example implementation of the scanner module manager of FIG. 1 or 2 in use with an example scanner and target media in accordance with the teachings of this disclosure.

In discussing the example scanner module manager 110 of FIG. 2, reference may be made to FIG. 3 in connection with the components of FIG. 2. FIG. 3 illustrates an example implementation of the scanner module manager 110 of FIG. 1 or 2 in use with an example scanner 120 (which may be implemented by the scanner 120 of FIG. 1) and target media 302 in accordance with the teachings of this disclosure. The target media 302 includes targets 304a-304e (which may be referred to collectively herein as the targets 304). The example scanner 120 of FIG. 3 includes five scanner modules 322a-322e (which may be referred to herein collectively as the scanner modules 322), a scan surface 324 (e.g., a transparent surface, such as glass or plastic), and a roller 326. The example scanner modules 322 may be contact image sensor (CIS) modules and the scanner 120 may be a large format scanner (e.g., a scanner capable of scanning media wider than 24 inches or other similar width threshold). In some examples, the scanner 120 may include more or less than the example five scanner modules 322. In the example of FIG. 3, the target media 302 (e.g., a piece of paper) may be fed into the scanner 120 via the roller 326 and scanned through the scan surface 324 using the scanner modules 322. In some examples, the scanner module manager 110 may control the scanner 120 or the roller 326 to feed the target media 302 to the scanner 120 (and to the scan modules 322). The example scanner module manager 110 analyzes a scan or scans of the scanned target media 302 in accordance with the teachings of this disclosure.

The example module analyzer 210 of FIG. 2 analyzes scans from the scanner 120 of FIG. 1 or 3, to identify color differences within the scans. For example, referring to FIG. 3, the module analyzer 210 may analyze portions (e.g., the targets 304) of the scanned target media 302 that were scanned by each scanner module 322a-322e of the scanner 120. In some examples, the module analyzer 210 identifies a color difference using any scanned media (e.g., an image, a document, etc.). As illustrated in the example of FIG. 3, the target media 302 includes a designated number of targets 304 (five) that corresponds to the number of scanner modules 322 (five) of the scanner 120. In the illustrated example of FIG. 3, the targets 304 may be a standard color chart (e.g., an IT8.7/2 color patch, an International Consortium on Color (ICC) standard chart, etc.).

In examples disclosed herein, the module analyzer 210 analyzes scans of the targets 304 of FIG. 3 to detect a color difference greater than a threshold (e.g., a threshold corresponding to a difference noticeable to the human eye, such as 2dE00 from the International Commission on Illumination (CIE) Lab or CIE-DE2000). The module analyzer 210 may analyze a spectral reflectance of the targets 304 in the scan. For example, the module analyzer 210 may identify colors in the scan of the target 304c having a steeped spectral reflectance in a certain color area (e.g., a blue color area, a red color area, a green color area, etc.) due to specifications of the scanner module 322c. The example steep spectral reflectance may cause a color between the scan of the target 304c relative to the other targets 304a, 304b, 304d, 304e. In such an example, the scan of the target 304c may be referred to as an off-color scan. When the module analyzer 210 identifies a color difference between an analyzed portion and a neighboring portion (or an average across all portions of the scanned media), the module analyzer 210 instructs the module profiler 220 to determine color profiles for the scanner modules 322.

The example module profiler 220 of FIG. 2 determines a profile for the scanner modules based on the scans of the targets 304. For example, the module profiler 220 may receive an indication from the module analyzer 210 that one of the scanner modules 322a-322e is scanning off-color scans of the target media 302 (or other media). Accordingly, based on an off-color scan of the target 304c, the module profiler 220 may determine a color profile for the scanner module 322c. The module profiler 220 may also generate a color profile for a scanner module (e.g., the scanner module 322b or the scanner module 322d) that neighbors the off-color scanner module 322c. In examples disclosed herein, a first scanner neighbors a second scanner if the first scanner is adjacent to the second scanner such that the first scanner scans a portion of media that is adjacent to the portion of media scanned by the second scanner (e.g., the scanner module 322c is a neighbor scanner module of the scanner modules 322b, 322d).

In examples disclosed herein, the module profiler 220 generates color profiles from a color standard, such as the International Consortium on Color (ICC) color standard. For example, an ICC color standard may be used to generate the color profiles for the scanner modules 322 to (e.g., a reference number, an identification number, a code, etc.) indicate a distribution of colors (e.g., an RGB distribution) scanned by the scanner modules 322. The example scanner profiles may include universal color coordinates (e.g., CIE Lab color coordinates) of standard color. The example targets 304 may be color charts based on the color standard. In some examples, the scanner module manager 304 may use or identify a reference identifier (e.g., via a user input, an image analysis, etc.) for a standard color chart of the targets 304. Based on the reference identifier, the module profiler 220 may determine an expected color chart for the scanned targets 304 to generate a profile corresponding to the scanner modules 322 (e.g., based on a color difference between a scan of the targets 304 and the targets 304).

Accordingly, the module profiler 220 may generate a color profile for any off-color scanner modules (e.g., the scanner module 322c) and a color profile of one of the other scanner modules or an average of the other scanner modules (e.g., the scanner modules 322a, 322b, 322d, 322e). In some examples, a color profile is generated for a neighboring scanner module (e.g., the scanner module 304b or the scanner module 304d) of the off-color scanner module. The example module profiler 220 may then forward a color profile for the off-color scanner module (e.g., the scanner module 322c) and a profile of a neighboring scanner module (e.g., the scanner module 322b or 322d) or a profile for the average of the other scanner modules (e.g., the scanner modules 322a, 322b, 322d, 322e) to the module color manager 230.

The example module color manager 230 may analyze and control/adjust color settings of scanner modules (e.g., the scanner modules 322 of FIG. 3) of the scanner 120. In examples disclosed herein, the module color manager 230 adjusts color settings for an off-color scanner module of a scanner. For example, color settings may be adjusted for the scanner module 322c to correct a color difference between scans of the scanner module 322c and scans of the other scanner modules 322a, 322b, 322d, 322e of the scanner 120. The color manager 230 may link the color profiles generated by the module profiler 220 to determine a transformation (e.g., an RGB to RGB transformation) to correct the off-color scanner module 322c to scan within a designated threshold (e.g., such that the scanner modules scan within the 2dE00 threshold). In some examples, the color manager 230 may use a look-up-table (LUT) that may be used by the scanner 120 to scan images. The example LUT may be used to control how the scanner modules 322 are to scan media to account for the color difference between an off-color scanner module and the other scanner modules. The example LUT may thus transform colors of the scans of the off-color scanner module (e.g., using software or firmware) to be within the designated threshold such that the color difference may be nearly or entirely mitigated in any subsequent scans. In some examples, the LUT may be uploaded into firmware of the scanner 120. Accordingly, prior to scanning media, the scanner 120 (or scanner modules 322) may refer to the LUT for color or scan settings to scan the media.

While an example manner of implementing the scanner module manager 110 of FIG. 1 is illustrated in FIG. 2, at least one of the elements, processes and/or devices illustrated in FIG. 2 may be combined, divided, re-arranged, omitted, and/or implemented in any other way. Further, the module analyzer 210, the module profiler 220, the module color manager 230, or, more generally, the scanner module manager 110 of FIG. 2 may be implemented by hardware or any combination of hardware and executable instructions (e.g., software or firmware). Thus, for example, any of the module analyzer 210, the module profiler 220, the module color manager 230, or, more generally, the scanner module manager 110 may be implemented by at least one of an analog or digital circuit, a logic circuit, a programmable processor, an application specific integrated circuit (ASIC), a programmable logic device (PLD) and a field programmable logic device (FPLD). When reading any of the apparatus or system claims of this disclosure to cover a software or firmware implementation, at least one of the module analyzer 210, the module profiler 220, and the module color manager 230 is/are hereby expressly defined to include a non-transitory machine readable storage medium, such as a storage device, a storage disk, a memory, a digital versatile disk (DVD), a compact disk (CD), a Blu-ray disk, etc. storing the executable instructions. Further still, the example scanner module manager 110 of FIG. 2 may include at least one element, process, or device in addition to, or instead of, those illustrated in FIG. 2, or may include more than one of any or all of the illustrated elements, processes and devices.

Figure 4:
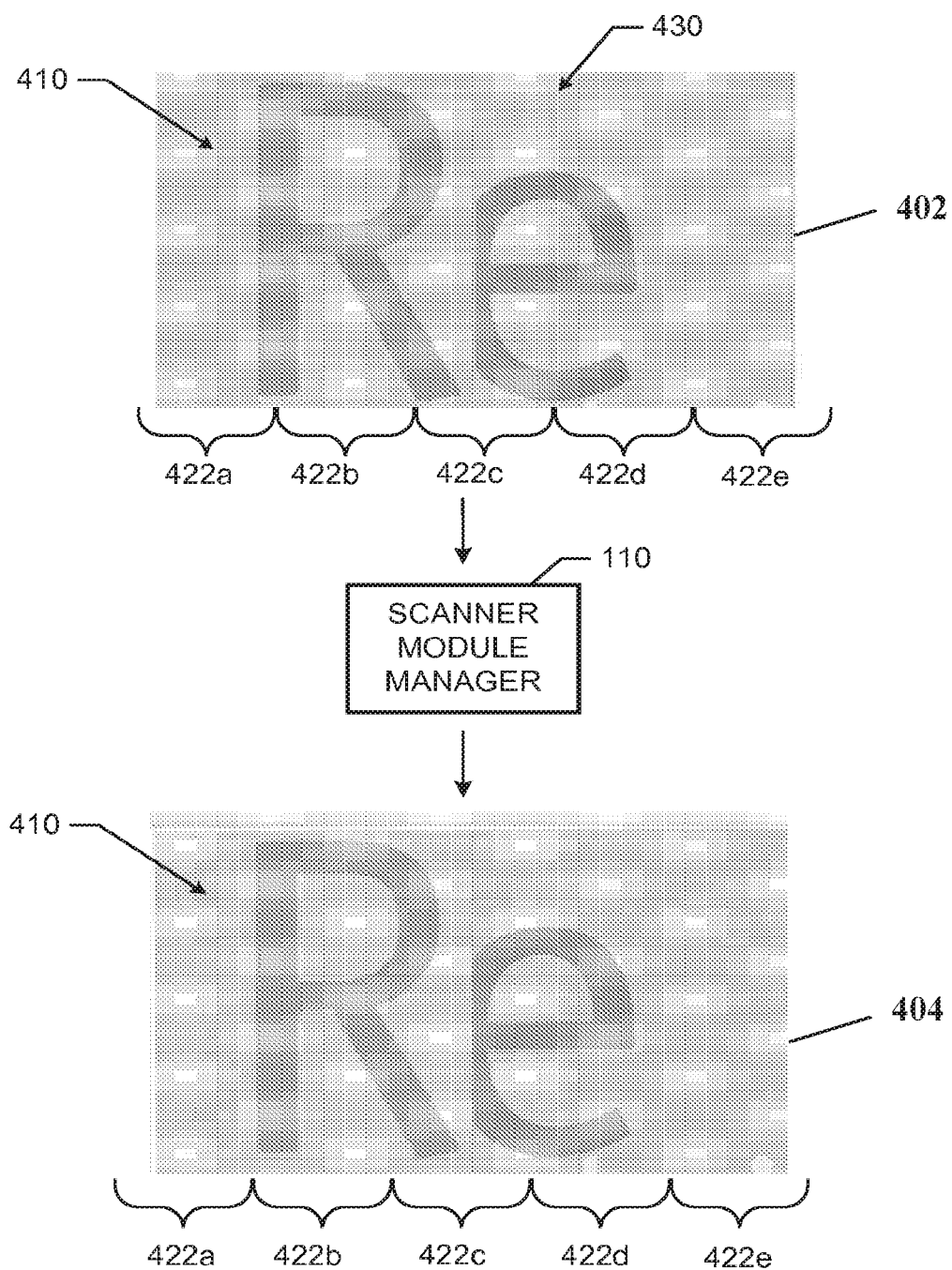
FIG. 4 illustrates results of an example color correction performed by the example scanner module manager of FIG. 1 or 2.

FIG. 4 illustrates results of an example color correction performed by an example scanner module manager 110, which may be implemented by the scanner module manager of FIG. 1, 2, or 3. In the example of FIG. 4, a first scan 402 is illustrated with a color difference and a second scan 404 is illustrated without a color difference. Both of the scans 402, 404 are of the same target media 410 (an image of "Re" with a lighter background behind the "R" and a darker background behind the "e"). Each of the scans 402, 404 has portions 422a-422e corresponding to portions scanned by respective scanner modules (e.g., the scanner modules 322 of FIG. 3) of a scanner (e.g., the scanner 120 of FIG. 1 or 3).

The color difference in the first scan 402 is between the portion 422c and the portion 422d. As can be seen in FIG. 4, the first scan 402 may leave a boundary 430 showing color differences between the portions 422c and 422d (i.e., the portions scanned by the off-color scanner module 322c and the neighboring scanner module 322d, respectively). The boundary 430 may be noticeable because the color difference is greater than a threshold color difference (e.g., 2dE00). The scanner module manager 110 of FIG. 4 may adjust settings in accordance with the teachings of this disclosure to correct the color difference of the first scan 402 such that the second scan 404, which may be a subsequent of the target media 410, does not include the color difference (i.e., any color difference between the portions 422a-422e is less than a threshold color difference, such as 2dE00).

Figure 5:
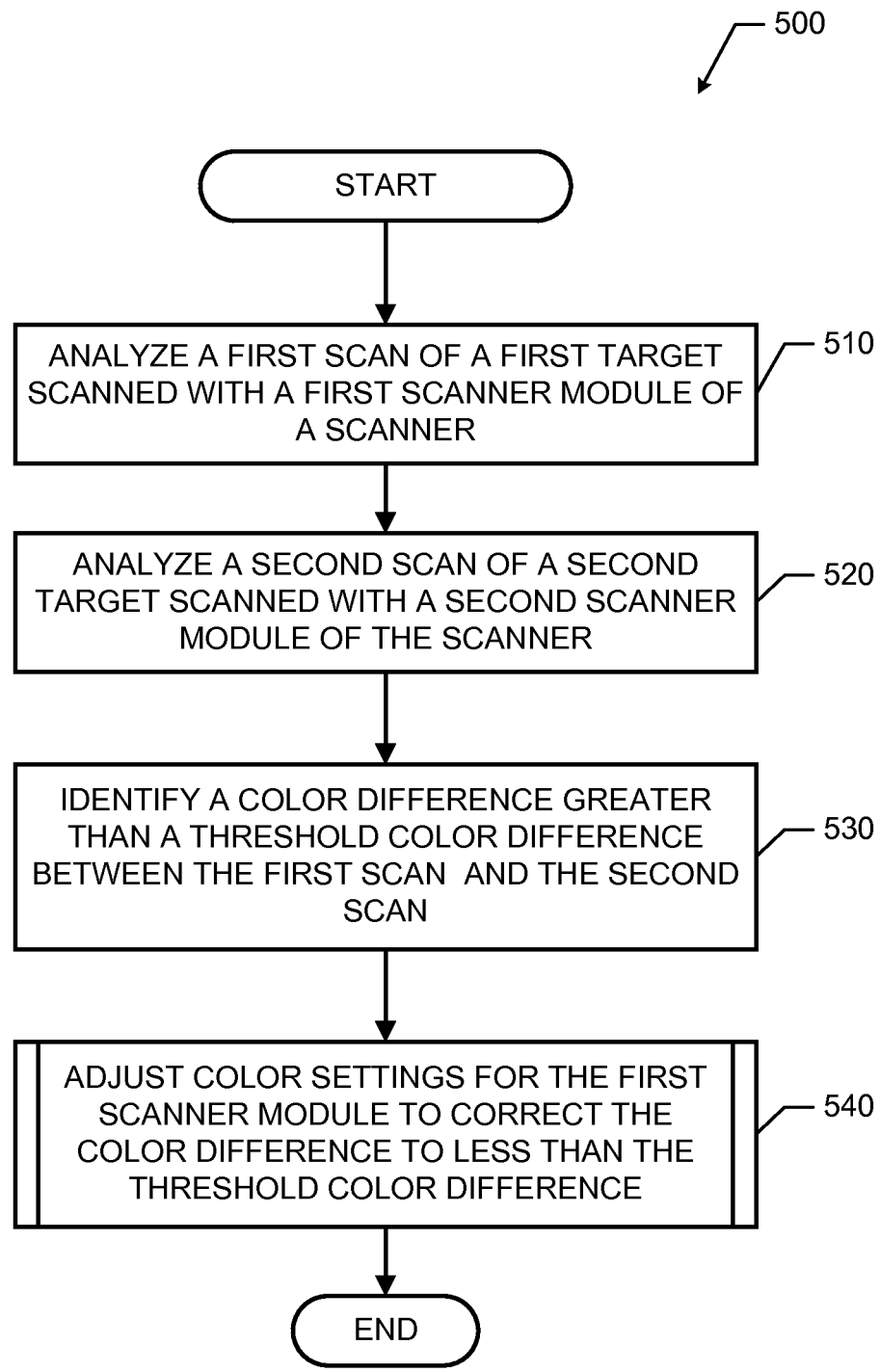
FIG. 5 is a flowchart representative of example machine readable instructions that may be executed to implement the scanner module manager of FIG. 2.
Figure 6:
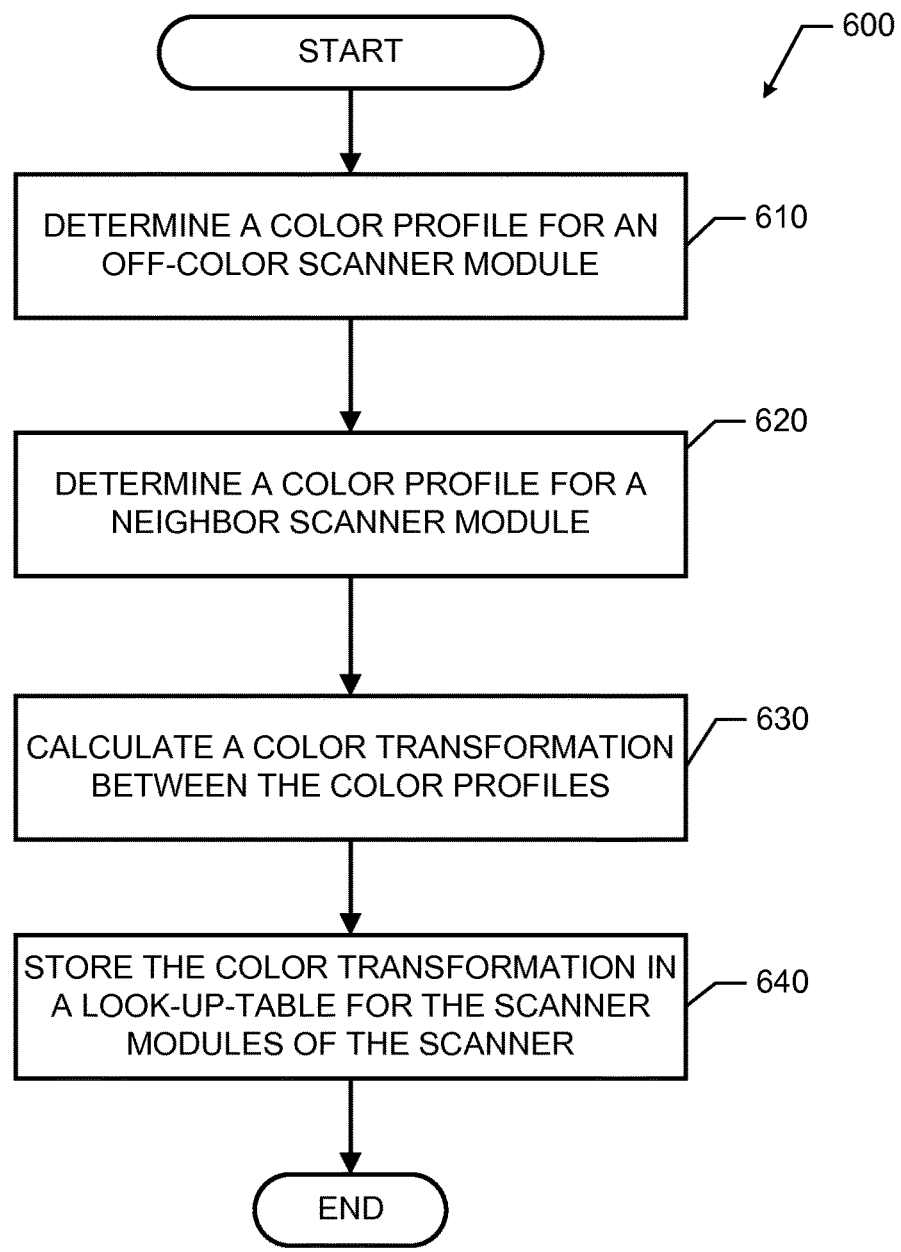
FIG. 6 is a flowchart representative of an example portion of the example machine readable instructions of FIG. 5 to implement the scanner module manager of FIG. 2.

Flowcharts representative of example machine readable instructions for implementing the scanner module manager 110 of FIG. 2 are shown in FIG. 5 or 6. In this example, the machine readable instructions comprise a program(s)/process(es) for execution by a machine. For example, such a machine may be a processor, such as the processor 712 shown in the example processor platform 700 discussed below in connection with FIG. 7. The program(s)/process (es) may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but part or all of the program(s)/process(es) may alternatively be executed by a device other than the processor 712 or embodied in firmware or dedicated hardware. Further, although the example program(s)/process(es) is/are described with reference to the flowcharts illustrated in FIG. 5 or 6, many other methods of implementing the example scanner module manager 110 may alternatively be used. For example, the order of execution of the blocks may be changed, or some of the blocks described may be changed, eliminated, or combined.

The example process 500 of FIG. 5 begins with an initiation of the scanner module manager 110 (e.g., upon startup, upon instructions from a user, upon startup of a device implementing the scanner module manager 110 (e.g., the scanner 120, the host device 130), etc.). The example process 500 may be executed to correct a color difference between scanner modules (e.g., between at least a pair of the scanner modules 322 of FIG. 3) of a scanner (e.g., the scanner 120). At block 510 of FIG. 5, the module analyzer 210 analyzes a first scan of a first target (e.g., the target 304c of FIG. 3) scanned with a first scanner module (e.g., the scanner module 322c of FIG. 3) of the scanner 120 of FIG. 3. At block 520, the module analyzer 210 analyzes a second scan of a second target (e.g., the target 304d) of a second scanner module (e.g., the scanner module 322d) of the scanner 120. In some examples, prior to blocks 510 and 520, the scan analyzer 110 controls the scanner to feed target media including the first target and the second target to the scanner 120 and first and second scanner modules 322c, 322d. In some examples, at blocks 510 and 520, the first scan and the second scan correspond to a first portion of target media and a second portion of target media scanned by a first scanner module and a second scanner module, respectively, of the scanner 120.

In FIG. 5, at block 530, the module analyzer 210 identifies a color difference greater than a threshold color difference (e.g., 2dE00) between the first scan and the second scan. For example, at block 530, the module analyzer 210 may compare the first scan and the second scan and determine a color difference that occurs due to differences in spectral reflectance in a certain color area (e.g., a blue area of an RGB scanner module) of the scanner modules. At block 540, module color manager 230 adjusts color settings for the first scanner module to correct the color difference to less than the threshold color difference. In some examples, prior to block 540 or during block 540, the module profiler may determine color profiles based on the first scan and the second scan. After block 540, the color difference may be mitigated such that future scans of do not include a color difference greater than the threshold color difference, and the example process 500 ends.

The example process 600 of FIG. 6 begins with an initiation of the scanner module manager 110. The example process 600 of FIG. 6 may be executed to implement the block 540 of FIG. 5. At block 610, the module profiler 220 determines a color profile for an off-color scanner module (e.g., the scanner module 322c of FIG. 3). At block 620, the module profiler 220 determines a color profile for a neighbor scanner module (e.g., the scanner module 322d of FIG. 3). At blocks 610, 620, the module profiler 220 may determine the color profiles based on comparing scanned targets to a standard color target (e.g., the standard color target, such as an ICC color target). The color profiles of blocks 610, 620 may be an RGB profile corresponding to a color standard (e.g., an ICC color standard). For example, a color profile may include a spectral reflectance corresponding to a colors, such as red, green, blue (RGB) used to scan the targets. In such an example, the color profile may indicate an amount of detected red, green, blue in the scanned target.

At block 630 of FIG. 6, the module color manager 230 calculates a transformation between the color profiles. For example, the module color manager 230 may determine a difference in each color (red, green, blue) in the scan and calculate the transformation corresponding to that difference. At block 640, the module color manager 230 stores the color transformation in a LUT for the scanner modules of the scanner 120. The example LUT may be used for subsequent scans of targets. For example, the scanner modules may retrieve color settings from the LUT to adjust color settings for future scans (by increasing an amount of a color or multiple colors to the scans). After block 640, the example process 600 ends.

As mentioned above, the example program(s)/process(es) of FIG. 5 or 6 may be implemented using coded instructions (e.g., computer or machine readable instructions) stored on a tangible computer readable storage medium such as a hard disk drive, a flash memory, a read-only memory (ROM), a compact disk (CD), a digital versatile disk (DVD), a cache, a random-access memory (RAM) or any other storage device or storage disk in which information is stored for any duration (e.g., for extended time periods, permanently, for brief instances, for temporarily buffering, or for caching of the information). As used herein, the term tangible computer readable storage medium is expressly defined to include any type of computer readable storage device or storage disk and to exclude propagating signals and to exclude transmission media. As used herein, "tangible computer readable storage medium" and "tangible machine readable storage medium" are used interchangeably. Additionally or alternatively, the example processes of FIG. 5 or 6 may be implemented using coded instructions (e.g., computer or machine readable instructions) stored on a non-transitory computer or machine readable medium such as a hard disk drive, a flash memory, a read-only memory, a compact disk, a digital versatile disk, a cache, a random-access memory or any other storage device or storage disk in which information is stored for any duration (e.g., for extended time periods, permanently, for brief instances, for temporarily buffering, or for caching of the information). As used herein, the term non-transitory computer readable medium is expressly defined to include any type of computer readable storage device or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
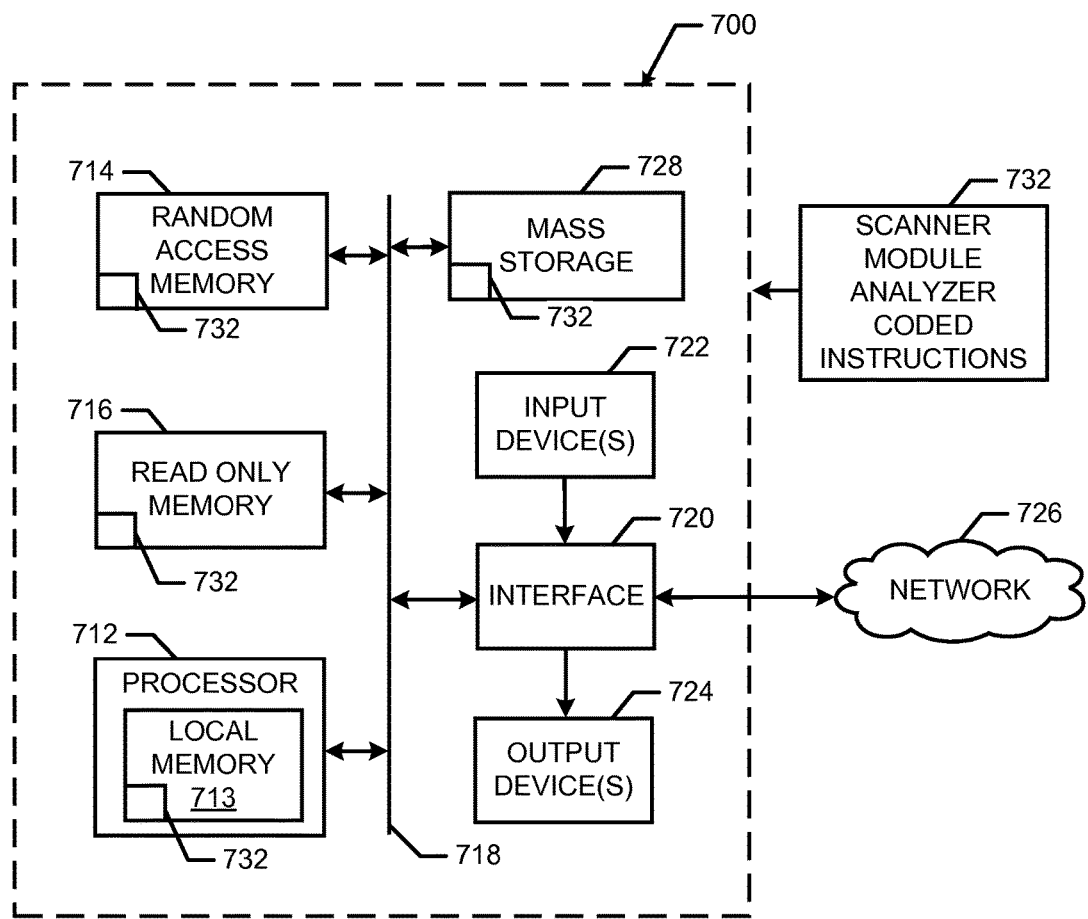
FIG. 7 is a block diagram of an example processor platform capable of executing the instructions of FIGS. 5 and/or 6 to implement the scanner module manager of FIG. 2.

FIG. 7 is a block diagram of an example processor platform 700 capable of executing the instructions of FIGS. 5 and 6 to implement the scanner module manager 110 of FIG. 2. The example processor platform 700 may be any apparatus or may be included in any type of apparatus, such as a server, a personal computer, a mobile device (e.g., a cell phone, a smart phone, a tablet, etc.), a personal digital assistant (PDA), an Internet appliance, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible computer readable storage medium such as a CD or DVD.

From the foregoing, it will be appreciated that the above disclosed methods, apparatus and articles of manufacture identify and correct color differences between scans of scanner modules of a scanner. In examples disclosed herein, the color settings for scanner modules of a scanner may be adjusted (e.g., using a look-up-table in firmware) to correct the color differences. Accordingly, in such examples, scanner modules having various specifications or ranges of specifications may be used in a scanner. In examples disclosed herein, color profiles may be generated to determine a color transformation for the color settings.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A method performed by a system comprising a hardware processor, comprising:
   analyzing a first scan of a first target scanned using a first scanner module of a scanner;
   analyzing second scan of a second target scanned using a second scanner module of the scanner, the first target and the second target being on a medium;
   identifying a color difference greater than a threshold color difference between the first scan and the second scan; and
   adjusting color settings for the first scanner module to correct the color difference to less than the threshold color difference, the adjusting of the color settings for the first scanner module reducing a color difference between respective scans obtained by the first scanner module and the second scanner module.

2. The method of claim 1, further comprising:
   determining the color settings of the first scanner module to correct the color difference.

3. The method of claim 1, further comprising determining a transformation to correct the color difference, and adjusting the color settings for the first scanner module based on the transformation, the transformation stored in a look-up table for the scanner.

4. The method of claim 3, wherein the first target and the second target are each a standard color target, and the color settings are determined by:
   determining a first scanner profile for the first scanner module, the first scanner profile based on the standard color target;
   determining a second scanner profile for the second scanner module, the second scanner profile based on the standard color target,
   wherein the color settings are based on a transformation from the first scanner profile to the second scanner profile.

5. The method of claim 4, wherein the first scanner profile and the second scanner profile comprise respective universal color coordinates of the standard color target.

6. The method of claim 3, the transformation comprising a red-green-blue to red-green-blue transformation.

7. The method of claim 3, wherein the transformation is from a first color space to the first color space.

8. The method of claim 3, further comprising:
   using the look-up table to transform a color of a scan obtained by the first scanner module.

9. The method of claim 1, further comprising feeding the medium to the scanner, and scanning the first target and the second target on the medium by the respective first scanner module and the second scanner module as the medium is fed to the scanner.

10. An apparatus comprising:
    a processor; and
    a non-transitory storage medium storing instructions executable on the processor to:
      identify a color difference between a first scanned target and a second scanned target, the first scanned target on a medium scanned by a first scanner module of a scanner and the second scanned target on the medium scanned by a second scanner module of the scanner;
      generate a first color profile based on the first scanned target and a second color profile based on the second scanned target;
      calculate a transformation between the first color profile and the second color profile;
      adjust scan settings of the first scanner module based on the transformation, the adjusting of the color settings of the first scanner module reducing a color difference between respective scans obtained by the first scanner module and the second scanner module.

11. The apparatus of claim 10, wherein the first scanner module and the second scanner module are neighboring scanner modules such that the first scanner module and the second scanner module are located adjacent one another in the scanner.

12. The apparatus of claim 10, wherein the instructions are executable on the processor to adjust the scan settings by storing the transformation for the first scanner profile in a look-up table of the scanner.

13. The apparatus of claim 10, wherein the instructions are executable on the processor to compare the first scanned target and a standard color target to generate the first color profile and compare the second scanned target to the standard color target to generate the second color profile.

14. The apparatus of claim 10, wherein the transformation is from a first color space to the first color space.

15. A non-transitory machine readable storage medium comprising instructions that, when executed, cause a machine:
   detect a color difference between a first scan of a first target on a medium and a second scan of a second target on the medium, the first target scanned by a first scanner module of a scanner and the second target scanned by a second scanner module of the scanner;
   determine a first color profile of the first scanner module based on the first scan of the first target and a standard color target;
   determine a second color profile for the second scanner module based on the second scan of the second target and the standard color target;
   calculate a transformation between the first color profile and the second color profile; and
   adjust color settings of the first scanner module using the transformation to correct the color difference, the adjusting of the color settings of the first scanner module reducing a color difference between respective scans obtained by the first scanner module and the second scanner module.

16. The non-transitory machine readable storage medium of claim 15, wherein the detected color difference is greater than a threshold color difference, and the transformation adjusts the color settings of the first scanner module to correct the detected color difference to less than the threshold color difference.

17. The non-transitory machine readable storage medium of claim 15, wherein the instructions, when executed, further cause the machine to store the transformation in a look-up table of the scanner, the look-up table to control color settings for the first scanner module and the second scanner module of the scanner.

18. The non-transitory machine readable storage medium of claim 15, wherein the second scanner module is a neighbor scanner module of the first scanner module.

19. The non-transitory machine readable storage medium of claim 15, wherein the transformation is from a first color space to the first color space.

* * * * *

UNITED STATES PATENT AND TRADEMARK OFFICE
CERTIFICATE OF CORRECTION

PATENT NO. : 10,397,446 B2  
APPLICATION NO. : 15/544790  
DATED : August 27, 2019  
INVENTOR(S) : Miguel Angel Lopez Page 1 of 1

It is certified that error appears in the above-identified patent and that said Letters Patent is hereby corrected as shown below:

In the Claims

In Column 10, Line 66, in Claim 13, delete "profile and" and insert -- profile, and --, therefor.

In Column 11, Line 5, in Claim 15, delete "machine:" and insert -- machine to: --, therefor.

Signed and Sealed this  
Twenty-fourth Day of December, 2019

Andrei Iancu  
*Director of the United States Patent and Trademark Office*